Oct. 16, 1945.  W. D. BLATZ  2,387,051
METHOD OF MAKING TUBING
Filed April 24, 1942
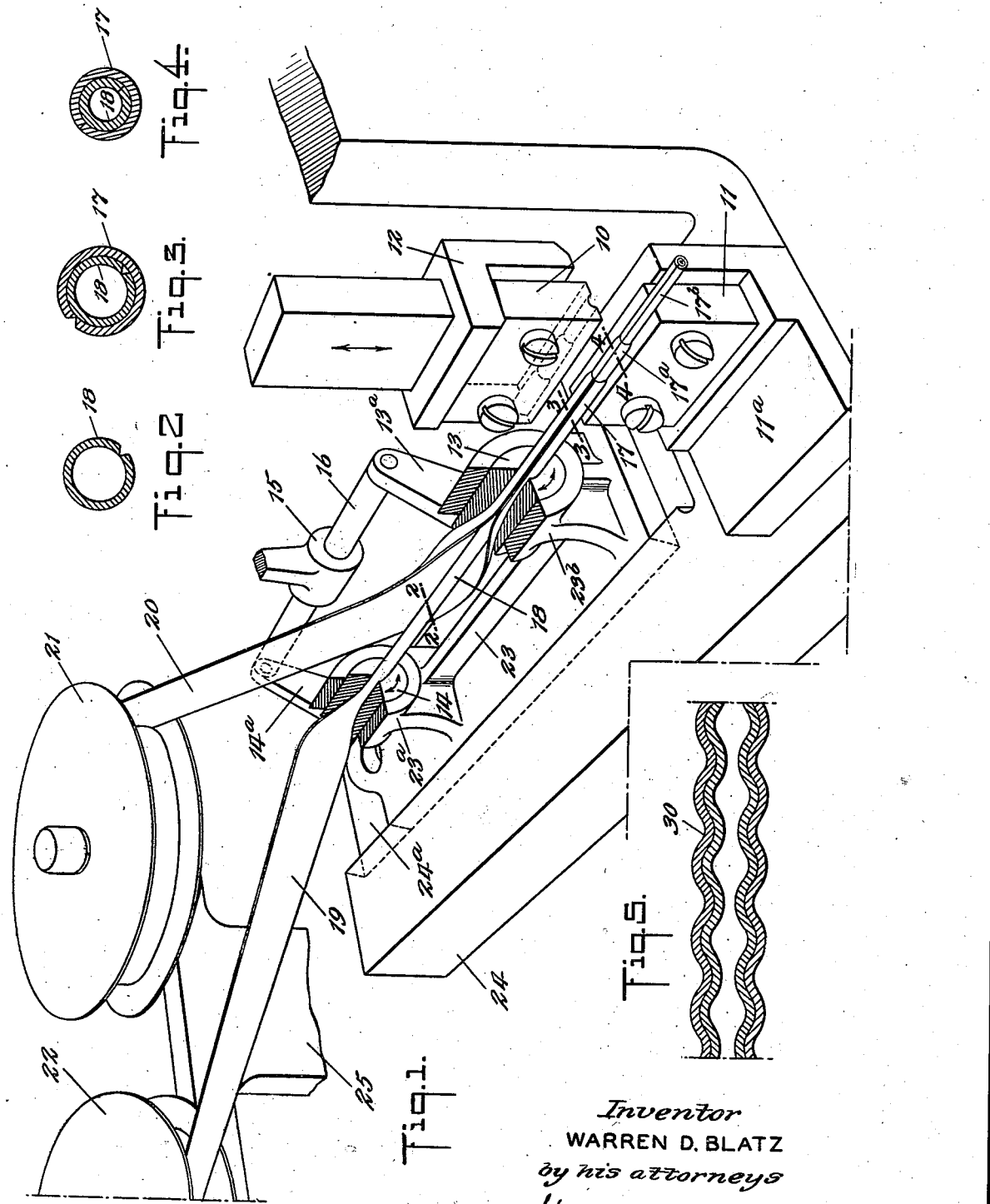
Inventor
WARREN D. BLATZ
by his attorneys Patented Oct. 16, 1945

2,387,051

UNITED STATES PATENT OFFICE 2,387,051

METHOD OF MAKING TUBING

Warren D. Blatz, Bridgeport, Conn., assignor to The Bead Chain Manufacturing Company, Bridgeport, Conn., a corporation of Connecticut Application April 24, 1942, Serial No. 440,393

8 Claims. (Cl. 29—188)

This invention relates to the manufacture of tubing and more particularly to the manufacture of tubing formed from one or more strips of stock of indefinite length and it is an object of this invention to provide an improved method of manufacturing tubing of the class described which is efficient in operation and produces tubing of improved construction particularly when used in forming multi-ply or laminated tubing from a plurality of strips. It is also an object of this invention to provide improved tubing of the class described.

Previously, tubing of the type described has been made by forming or shaping the strips by means of rolls and the tubing was then drawn through circular dies to reduce the tubing to the desired diameter and where a plurality of plies were used, to bring the plies into tight engagement. However, variations in the temper or tensile strength of the strips caused variations in the elongation of the plies during the drawing operation and resulting variations in the thickness of the plies. Such variations in the thickness of the plies result in voids or spaces occurring between the plies of the tubing which have to be filled with the metal used to braze or seal the plies together. Further the reduction in diameter which it is possible to obtain through a single drawing die is very small so that a number of drawing dies usually have to be used in succession particularly where the strips are of a material of low tensile strength.

In manufacturing tubing in accordance with this invention, a strip or strips of suitable material are formed to tubular shape by circular forming dies. Where a multi-ply tube is to be formed, a tube is first formed of a single strip and then the other strip or strips are individually and successively formed about that tube until a tube of the desired number of plies is secured. The tube thus formed is then swaged to the desired diameter causing a reduction in the diameters of all the plies of the tube and a thickening of each ply as well as insuring a tight engagement throughout the adjacent plies. The plies of the tube, when shaped by the circular forming dies, tend to return partly to the flat condition of the original strip or strips but, after swaging, tend to retain the tubular shape and size given by the swaging so that it is not necessary to subject the tubing to pressure during the subsequent brazing or sealing operation in order to retain the plies engaged or the tubing of the proper dimension.

In the drawing in which there is shown mechanism for the making of tubing of two plies in accordance with this invention—

Figure 1 is a fragmentary perspective drawing, partly broken away, showing such parts of a machine as are necessary to illustrate the manufacture of tubing in accordance with this invention;

Figures 2, 3 and 4 are sectional views of the tubing in various stages of its manufacture, the views being taken as on the lines 2—2, 3—3 and 4—4, respectively, of Figure 1, and Figure 5 is a vertical longitudinal sectional view of tubing of modified form constructed in accordance with this invention.

The machine parts shown in the drawing comprise a base 24 having a groove or channel 24a in which is mounted a slide 23 adapted to be reciprocated by suitable operating means (not shown). The slide 23 is provided with standards 23a and 23b in which drawing dies 14 and 13, respectively, are rotatably mounted. To oscillate the drawing dies 14 and 13, in unison, the dies have attached thereto the arms 14a and 13a, respectively, which are joined by a bar 16 having its ends supported in the arms. Attached to the bar 16 is a member 15 which extends to suitable operating means (not shown) adapted to reciprocate the member 15 and thus oscillate the drawing dies 14 and 13.

The base 24 also supports a holder 11a for a swaging die 11 which cooperates with a corresponding die 10 mounted on a reciprocating carrier 12 which is operated by suitable means (not shown). Means for operating the slide 23 and the dies 10, 13 and 14 have not been shown as means for operating such slides and dies are shown in the patent to Goodridge and Gagnon No. 1,087,876, issued February 17, 1914. Reels 21 and 22 mounted on a suitable bracket 25 supply strips 20 and 19, respectively, of suitable material, preferably metal, for forming the tubing.

In the manufacture of tubing, the strip stock 19 from the reel 22 is drawn through the forming die 14 to form a tube, as 18, while the strip stock 20 from the reel 21 is drawn through the forming die 13 to form a tube as 17, around the tube 18, the dies 14 and 13 being shown arranged so that the seams in the plies are approximately 180 degrees apart although other spacing of the seams may be used. The tubing is then passed between the swaging dies 11 and 10 and swaged, in a plurality of steps as at 17a and 17b, to the desired outside diameter. The dies 14 and 13 form the tubes 18 and 17 with the edges of the strips abutting, as shown in Figures 2 and 3, substantially throughout. Although the die 13 forms the outer ply as closely as possible about the inner ply without causing excessive reduction of the thickness of the plies or the diameters of the tubes some voids or spaces between the plies remain. The swaging operation causes the edges of the strips forming the plies to tightly abut throughout, as shown in Figure 4, thickens the walls of the plies slightly and eliminates substantially all voids between the plies. The swaging also breaks up any oxide film on the metal surface thus providing clean metal for the subsequent brazing operation. This removal of the oxide film and the elimination of the voids between the plies insures uniform brazing of the tubing.

The means operating the reciprocating carrier 12 is arranged to cause the dies 10 and 11 to remain in engagement for a short period at each operation and, while the dies 10 and 11 are thus held engaged and the tubing held therebetween, the slide 23 is operated to draw the dies 14 and 13 outwardly or away from the dies 10 and 11 and thus form additional portions of tubing from the strips 19 and 20. Upon completion of the outward movement of the dies 14 and 13 the die 10 is withdrawn from the die 11 and operated for the next swaging stroke. During this period the slide 23 is moved inwardly or towards the dies 10 and 11 and during this inward movement the friction of the strips in the dies 14 and 13 causes the tubing to be advanced between the dies 10 and 11 and additional stock to be drawn from the reels 22 and 21. The extent of the movement of the slide 23 is just sufficient to advance the tubing between the dies 10 and 11 from one swaging position or step to the next. During one movement of the tubing inwardly towards the dies 10 and 11 the rod 15 is operated to rotate the dies 14 and 13 through approximately 90 degrees in one direction and during the next inward movement of the tubing the dies 14 and 13 are rotated through approximately 90 degrees in the opposite direction. These oscillating movements of the dies 14 and 13 are repeated upon successive inward movements of the tubing in order to insure the swaged tubing being cylindrical. The slide 23, the tubing and the dies 14 and 13 have ceased movement or operation when the tubing is again engaged between the dies 10 and 11 in the next swaging operation and remain stationary until the swaging stroke is fully completed. Then during the ensuing dwell period of the dies 10 and 11 the outward movement of the slide 23 and dies 14 and 13 is again made.

While the strip stock is shown as being fed from the reels directly to the forming dies 14 and 13, it is to be understood that the strips can be partially formed to a tubular shape by means of forming rolls before being engaged by the dies 14 and 13.

In Figures 1 to 4, the tubing formed is shown as of a uniform cylindrical shape, but it is to be understood that by the use of suitable swaging dies tubing or tubular sections of varying diameter or form may be produced as the corrugated tubing 30 of Figure 5. The various steps in the manufacture of tubing 30 are the same as in the manufacture of the tubing of Figures 1 to 4, care being taken to relate the movements of the stock and tubing to the spacing of the corrugations of the finished tubing.

After passing from the swaging dies 10 and 11 the tubing may be brazed or sealed by any usual or suitable means so as to close the longitudinal seams in the tube plies and secure the plies together.

While the invention has been shown and described as in the manufacture of tubing having two plies, it is to be understood the invention is equally applicable to the manufacture of tubing having a greater or lesser number of plies. In the manufacture of tubing of a single ply the method shown and described is found to be especially advantageous in that the swaging causes the seam to be tightly closed and to remain so during the brazing or welding thus eliminating the need for applying pressure to the tubing at that time and avoiding an imperfect product.

What is claimed is:

1. The method of making tubing from continuous strip stock which comprises moving the stock longitudinally, fashioning successive portions of the stock into tubular form and subjecting successive sections of said tube to cold swaging operations between cooperating dies constructed and arranged to reduce the diameter of the tube simultaneously throughout a tube section and thicken the wall of said tube sections throughout.

2. The method of making multi-ply tubing from continuous strips of stock which comprises moving the strips longitudinally, fashioning successive portions of one strip into tubular form to constitute an inner ply, fashioning successive portions of the second strip into tubular form around the first strip and cold swaging successive sections of the concentric tubes between cooperating dies constructed and arranged to simultaneously swage an entire section of said concentric tubes into intimate contact throughout.

3. The method of making multi-ply tubing from continuous strips of stock which comprises moving the strips longitudinally, fashioning successive portions of one strip into tubular form to constitute an inner ply, fashioning successive portions of the second strip around the first strip and subjecting successive sections of the concentric fashioned strips to cold swaging operations between cooperating dies constructed and arranged to simultaneously reduce the diameters of both fashioned strips throughout an entire section and thicken said strips.

4. The method of making multi-ply tubing from continuous strips of stock which comprises moving the strips longitudinally step by step, fashioning successive portions of one strip into tubular form to constitute an inner ply, fashioning successive portions of the second strip into tubular form around the first tube and subjecting successive sections of the concentric tubes to cold swaging operations between cooperating dies constructed and arranged to simultaneously reduce the diameters of both tubes throughout an entire section, thicken the walls of said tubes and insure the tubes remaining closed along their longitudinal seams.

5. The method of making multi-ply tubing from continuous strips of stock which comprises moving the strips longitudinally step by step, fashioning successive portions of one strip into tubular form to constitute an inner ply, fashioning successive portions of the second strip into tubular form around the first tube, subjecting successive sections of the concentric tubes to cold swaging operations between cooperating dies constructed and arranged to simultaneously reduce the diameters of both tubes throughout an entire section and relatively rotating said tubes and swaging dies between swaging operations.

6. The method of making double ply tubing from two continuous strips of stock which comprises moving the strips longitudinally step by step, fashioning successive portions of one strip during successive periods of rest of the strip into tubular form to constitute an inner ply, fashioning successive portions of the second strip around the first strip during successive periods of rest of both strips, the longitudinal seams being angularly displaced, subjecting successive sections of the concentric fashioned strips during successive periods of rest of the strips to cold swaging operations between cooperating dies constructed and arranged to simultaneously reduce the diameters of the fashioned strips throughout an entire section step by step and insure the seam remaining closed and partially rotating the strips between swaging operations thereon.

7. The method of making double ply tubing from two continuous strips of stock which comprises moving the strips longitudinally by repeated uniform movements, fashioning successive portions of one strip during successive periods of rest of the strip into tubular form to constitute an inner ply, fashioning successive portions of the second strip around the first strip during successive periods of rest of both strips and subjecting successive sections of the concentric fashioned strips during successive periods of rest of the strips to cold swaging operations between cooperating dies constructed and arranged to simultaneously reduce the diameters of the fashioned strips throughout an entire section step by step and thicken said strips.

8. The method of making multi-ply tubing from continuous strips of stock which comprises fashioning a strip into tubular form, fashioning a second strip into tubular form about said first tube and cold swaging said tubes into intimate contact throughout between cooperating dies constructed and arranged to simultaneously reduce the diameters of an entire section of said tubes.

WARREN D. BLATZ.